United States Patent Office 3,514,494
Patented May 26, 1970

3,514,494
PURIFICATION OF ALCOHOLS
James T. Gragson, Bartlesville, Okla., assignor to Phillips Petroleum Company, a corporation of Delaware
No Drawing. Filed Mar. 22, 1967, Ser. No. 625,013
Int. Cl. C07c 29/24, 69/80
U.S. Cl. 260—643      7 Claims

ABSTRACT OF THE DISCLOSURE

An alcohol containing conjugated olefin impurities is mixed with a dienophile, heated to allow the conjugated olefin and the dienophile to react in a Diels-Alder type reaction, and separated from the mixture to recover a purified alcohol which, upon esterification produces a substantially colorless ester. One example of a dienophile is maleic anhydride.

---

This invention relates to the purification of alcohols. In one aspect, this invention relates to a process for the purification of oxo alcohols. In another aspect, this invention relates to the removal of conjugated olefin impurities from oxo alcohols.

The oxo process for producing oxo alcohols involves reacting an olefin compound with carbon monoxide and hydrogen. This results in the formation of an aldehyde compound having 1 carbon more than the olefin starting material. The carbon monoxide attaches to one of the carbon atoms of the olefinic linkage and the hydrogen attaches to the other carbon atom of the olefinic linkage. The oxo aldehydes thus formed can be reduced to the corresponding alcohols by hydrogenation in the presence of a suitable catalyst. The alcohols can then be recovered from the total hydrogenation reaction product by any suitable manner, such as distillation.

The oxo alcohols so produced can be used to make phthalate ester plasticizers. However, the oxo alcohols so used must meet rigid color specifications. Not only must the alcohol itself be water-white, it must produce very little color during esterification. Many times the oxo alcohols produced contain impurities which are carried over with the alcohol during fractionation. Because of the rigid color standards of oxo alcohols used to make plasticizers and the fact that the impurities in the alcohol produce highly colored and therefore undesirable products, means are constantly being sought to improve the color stability of the oxo alcohol and esters produced by the esterification of the alcohol. It is the removal of these color producing impurities to which the present invention relates.

According to the present invention I have now discovered that certain color producing impurities of alcohols produced by the oxo process are conjugated olefins and the alcohol can be purified by admixing the alcohol with a dienophile at reaction conditions to allow the conjugated olefins present and the dienophile to react in a Diels-Alder type reaction. The reaction product and the alcohol are then separated producing an alcohol which upon esterification forms a substantially colorless ester.

An object of this invention is to produce color stable oxo alcohols.

Another object of this invention is to produce alcohols which upon esterification produce esters which are substantially colorless.

These and other objects of the invention will become apparent to one skilled in the art from a study of the written disclosure and the appended claims.

The Diels-Alder reaction, a synthetic reaction consists in 1,4-addition of a diene to a second component, a dienophile, can be illustrated by the reaction of butadiene with maleic anhydride by the formula:

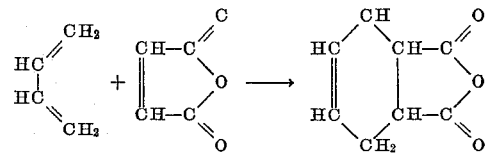

The Diels-Alder reaction is not limited to butadiene and maleic anhydride, but these are only used to illustrate the reaction. Examples of materials capable of undergoing the Diels-Alder reaction are discussed in detail in "Organic Reactions," vol. 4, chapters 1 and 2, and vol. 5, chapter 3. Care must be exercised to control the reaction conditions because of the thermal instability of the adducts from the Diels-Alder reaction. However, suitable results for the removal of conjugated dienes and trienes from the oxo alcohol can be derived by employing a dienophile such as quinone, cinnamic acid, acrolein, alpha-sulfolene, and maleic anhydride. The dienophiles react in accordance with the Diels-Alder reaction with the conjugated dienes and trienes and thus facilitate their removal from the alcohol and produce a color stable product having much improved color characteristics.

The alcohols which can be purified by the present invention and thus have an improved color stability can be any alcohol containing conjugated olefin impurities. Especially suitable results have been obtained where the alcohol is one produced by the oxo process.

In actual operation the alcohol produced by the oxo process, and containing conjugated olefin impurities is admixed with a dienophile, preferably, one selected from the group consisting of maleic anhydride, quinone, cinnamic acid, acrolein, and alpha-sulfolene, at a temperature within the range of from about 75° to 400° F. for a sufficient period of time to allow the conjugated olefins and the dienophile to react in a Diels-Alder type reaction. Suitable results have been obtained where the resulting mixture of the dienophile and the alcohol is heated to a temperature within the range of 225° F. to 300° F. The dienophile added to the alcohol is present in the range of about 0.1 to 5 weight percent dienophile, preferably, about 0.5 to 1.5 weight percent per weight of alcohol.

Once the Diels-Alder type reaction has progressed the mixture can be separated to produce a substantially conjugated olefin-free alcohol by fractionating the resulting mixture to produce an overhead product which is a substantially conjugated olefin-free, colorless alcohol.

When treating oxo alcohols containing a large percentage of aldehyde it is preferred to first fractionate the alcohol to remove the aldehyde prior to treatment of the alcohol with the dienophile.

The following example will illustrate conditions under which the process of this invention can be practiced. It is understood that such example is for the purpose of illustration only and must not be considered limiting of the invention.

Example

A sample of oxo alcohol containing a mixture of $C_7$–$C_9$ alcohols was treated with about 1 weight percent maleic anhydride based on the weight of the alcohol at about 250° F. for about 1 hour. The product was then washed with water and fractionated. The heart cut, amounting to about 75 to 80 percent of the charge, was combined and an acid stability test run on the product. The APHA color was 25 to 30.

A sample of the same starting alcohol was fractionated without the treatment of the maleic anhydride in the same column. The APHA color was greater than 500 for the sample.

Therefore, it is clearly evident that the treatment of the oxo alcohol with maleic anhydride at conditions suitable for the Diels-Alder reaction greatly improve the color stability of the alcohol and the esters produced by the alcohol upon esterification. The above data indicates that the color removal is due to the removal of conjugated diene systems by Diels-Alder type reaction with a dienophile.

The test employed for the determination of the APHA color was one well known in the industry as a measure of the alcohol color stability. The test consisted of mixing 8 ml. of concentrated sulfuric acid dropwise with 100 ml. of the alcohol, maintaining the resulting mixture for one hour at 100° C. At the termination of the heating period the color of the mixture was measured with APHA standards, American Public Health Association color standards, as described in the American Society for Testing Materials, ASTM designation D1209–54. It is generally agreed that the maximum APHA color value allowable for alcohols used in plasticizers is about 50 APHA.

Although the invention has been described in considerable detail, it must be understood that such description is for the purpose of illustration only and that many variations and modifications can be made by one skilled in the art without departing from the spirit and scope of the invention.

I claim:

1. A process for purifying an oxo alcohol containing conjugated olefin impurities which comprises:
   (a) admixing a dienophile with said alcohol to form a resulting mixture consisting essentially of said alcohol, said conjugated olefin impurities and said dienophile, wherein said dienophile is present in an amount in the range of about 0.1 to 5 weight percent dienophile percent of alcohol;
   (b) heating said resulting mixture at a temperature within the range of about 75 to 400° F., for a sufficient period to allow conjugated olefin impurities and said dienophile to react in a Diels-Alder type reaction; and
   (c) separating the resulting mixutre of step (b) by fractionation to recover an overhead product which is a substantially conjugated olefin free alcohol.

2. A process according to claim 1 where said alcohol is produced by the oxo process.

3. A process according to claim 1 wherein said dienophile has an ethylenic double bond flanked by a radical selected from the group consisting of carbonyl, carboxyl, and sulfonyl.

4. A process according to claim 3 wherein said dienophile is selected from the group consisting of quinone, cinnamic acid, acrolein, alpha-sulfolene and maleic anhydride.

5. A process according to claim 4 wherein said dienophile is maleic anhydride.

6. A process according to claim 1 wherein said dienophile is present in an amount in the range of about 0.5 to 1.5 weight percent.

7. A process according to claim 1 wherein said dienophile is maleic anhydride, said maleic anhydride being present in the amount of from about 0.5 to 1.5 weight percent; said resulting mixture is heated to a temperature within the range of about 225° F. to 300° F.; and said resulting mixture is fractionated to recover said substantially conjugated olefin free alcohol.

References Cited

UNITED STATES PATENTS

| | | | |
|---|---|---|---|
| 2,632,021 | 3/1953 | Robison et al. | 260—485 |
| 2,834,801 | 5/1958 | Aldridge et al. | 200—643 |
| 2,867,651 | 1/1959 | Wise. | |
| 2,903,477 | 9/1959 | Hughes et al. | 260—632.5 |

FOREIGN PATENTS

| | | |
|---|---|---|
| 678,997 | 9/1952 | Great Britain. |
| 844,834 | 8/1960 | Great Britain. |

OTHER REFERENCES

Kloetzel. Organic Reactions, vol. IV (1948), pp. 1–10, 40, 41, 89 and 90.

LEON ZITVER, Primary Examiner

J. E. EVANS, Assistant Examiner